Feb. 24, 1925.

H. D. GUMPPER

POWER PLATFORM TRUCK

Filed Sept. 4, 1923

Inventor
Harold D. Gumpper,
By
Attorney

Feb. 24. 1925.

H. D. GUMPPER

POWER PLATFORM TRUCK

Filed Sept. 4, 1923

Inventor

Harold D. Gumpper,

By

Attorneys

Patented Feb. 24, 1925.

1,527,431

UNITED STATES PATENT OFFICE.

HAROLD D. GUMPPER, OF DETROIT, MICHIGAN.

POWER-PLATFORM TRUCK.

Application filed September 4, 1923. Serial No. 660,682.

*To all whom it may concern:*

Be it known that I, HAROLD D. GUMPPER, a citizen of the United States of America, residing at Detroit, in the county of Wayne and State of Michigan, have invented certain new and useful Improvements in Power-Platform Trucks, of which the following is a specification, reference being had therein to the accompanying drawings.

This invention relates to power trucks of the kind that are used for transportation purposes in large factories, mills, warehouses, railway shops, railway stations, and other places where loads are transported for short distances. Such trucks are ordinarily electrically operated, the source of power being from storage battery cells. Electrical power from these cells is supplied to the electric motor which drives the truck. Certain types of trucks are also equipped with additional motors for elevating the load platform, driving hoisting mechanisms, and operating winding drums. Power for operating these motors is also derived from storage battery cells. Such cells must obviously be recharged from time to time making it necessary to keep the truck inactive during this period or to remove the discharged cells from the truck and replace them with a newly charged battery. Batteries have been used in order that a truck may be independent of any remote source of energy, also on account of the limited space allotted to the power plant on such a truck.

My invention aims to substitute an internal combustion engine for the usual storage batteries, and in making such substitution, it is necessary that I employ an electric generator and arrange the engine and generator, with its essential accessories, in the limited space allowed for such purpose on a truck.

My invention further aims to provide a power plant unit which is self-contained, and portable to the extent of being movable from one truck to another, and in consequence of this exchangeable feature of my invention, a power plant unit can at all times be held in reserve for instant installation should a unit need replacement.

My invention still further aims to arrange an internal combustion engine, electric generator, fuel supply and water cooling systems in a very compact manner, so that it will occupy a comparatively small space on a small truck, without any sacrifice in the capacity, power, strength or lasting qualities of the truck. All this is accomplished without increasing the weight of the truck, and other features of my invention will appear as the construction is herein described in the accompanying drawings, wherein—

Figure 1:
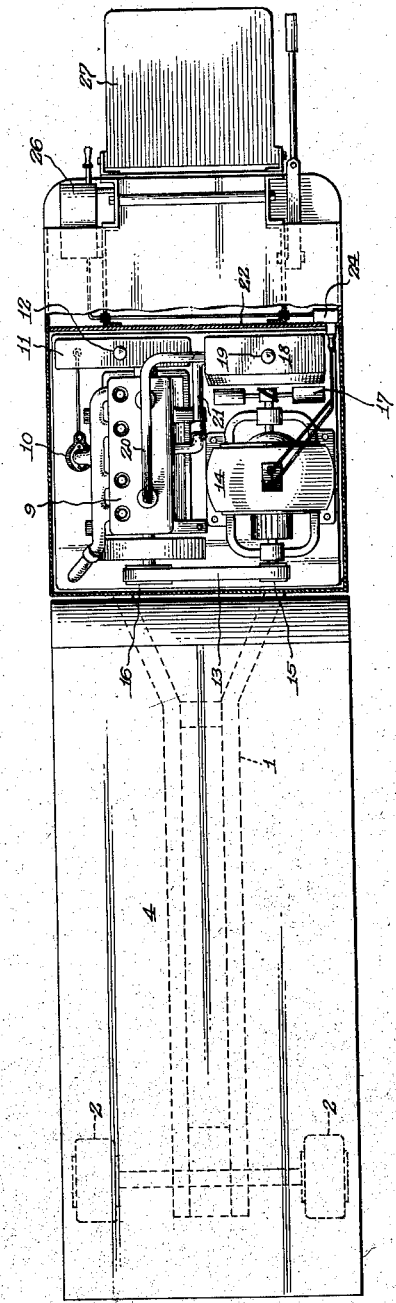
Figure 1 is a plan of a truck of the elevating platform type in accordance with my invention.
Figure 2:
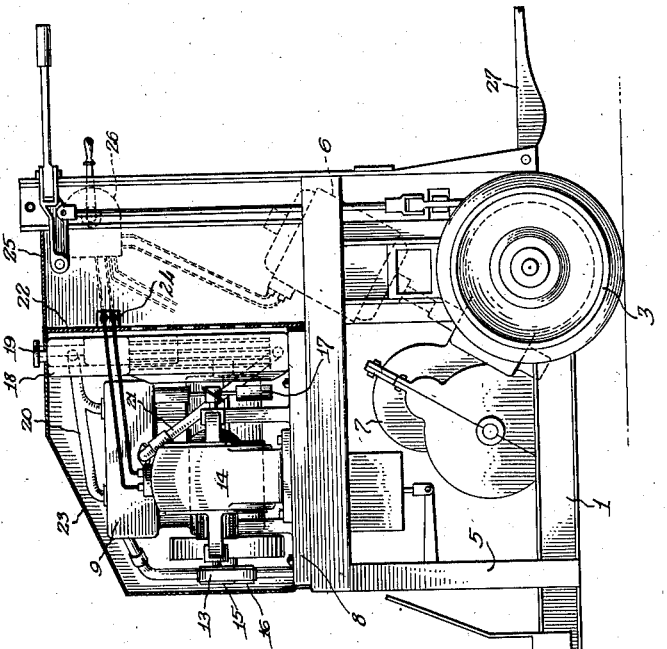
Fig. 2 is a side elevation of the same partly in section.

In the drawings, the reference numeral 1 denotes a truck chassis, and under one end of the chassis is a small truck 2, and under the opposite end thereof is a large truck 3 which is adapted to be driven. On the greater part of the chassis 1 is an elevating platform 4, and at the rear end of the chassis is a framework 5 about an operating mechanism employed for driving the truck and raising and lowering the platform 4. The operating mechanism may include a motor 6 for propelling the truck, and a lifting motor 7 by which the platform 4 may be raised, all of such mechanism and the truck structure thus far described being of a conventional form commonly used and a good example to which my improvements are applicable. The motor 6 is ordinarily driven from storage batteries located on the framework 5 with suitable controlling mechanism by which an operator on the rear end of the truck may readily control and guide the movement of the truck, besides controlling the operation of the elevating platform 4.

As set forth in the beginning, I dispense with storage batteries, and in lieu thereof I provide a power unit, which is detachably mounted on the framework 5, at the forward end thereof, thus leaving sufficient room at the rear end of the framework for such controllers, plugs, operating levers and other devices as may be essential for perfect control of the truck.

The power unit comprises a base 8, and mounted on one side thereof is an internal combustion engine 9 which may have any suitable fuel supply, but I show a carbureter 10 supplied from a fuel tank 11 provided with a filling connection 12. The fuel tank 11 is comparatively narrow and is vertically disposed at such a height on the base 8, that fuel may flow by gravity to the engine carbureter. The design of the tank 11 is such that it may be placed in close proximity to the rear end of the engine 9, and at the forward end of said invention is a belt transmission 13 attached to an electric generator 14 mounted on the base 8 at the side of the engine 9. The electric generator 14 has its armature shaft 15 driven by the belt transmission 13 from the engine shaft 16, and it is obvious that gearing or any other form of transmission mechanism may be substituted for the belt drive.

The rear end of the armature shaft 15 is provided with a conventional form of fan 17 inducing a draft in a radiator 18 forming part of a water cooling system of the engine 9, said radiator having a filling connection 19 and conduit connections 20 and 21 to the water jacket of the engine 9. The radiator 18 is also comparatively narrow, and its location at the rear end of the base 8, along the side of the fuel tank 11, permits of the base 8 being placed in proximity to an apertured control board or partition 22 located in a casing or housing 23 mounted on the framework 5.

The greater part of the housing or casing 23 is hinged relative to the base 8 so that it may be swung to an open position to permit of easy access being had to the power plant, and such electrical connections as are established with the electric generator 14, are made through plug and socket connections 24 on the control board 22 or any part of the detachable power unit.

The control board or partition 22 may form part of the power unit or part of a casing or housing 25 mounted on the rear end of the framework 5 and adapted to house such control device as may be necessary for the operation of the truck. Among these control devices may be a controller 26 electrically connected to the socket and plug connections 24, also to the motors 6 and 7 of the truck, so that an operator of the truck standing on the rear platform 27 thereof may control the supply of electrical current to said motors. Ordinarily means is provided whereby the motors may be independently operated, and since the motors are adapted to be operated direct from a generator, it is obvious that circuit breakers, rheostats, fuses and such other electrical devices may be employed as are essential for safe and economical operation of the electrical apparatus.

Figure 3:
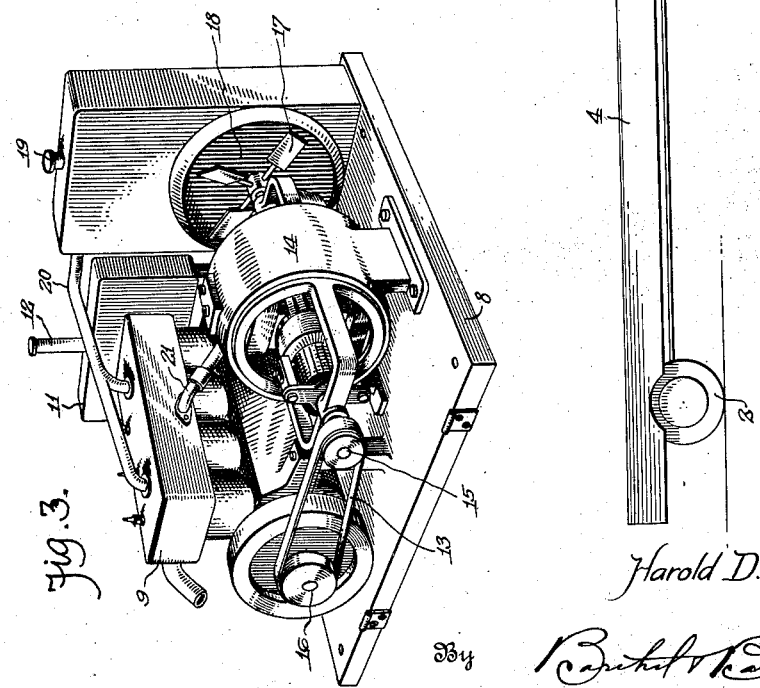
Fig. 3 is a perspective view of a detached power unit.

By reference to Figs. 1 and 3, it will be noted that the engine, generator and other parts of the power unit are very compactly assembled upon the base 8, and with this base detachably mounted upon the framework 5, it may be disconnected and bodily removed, thus permitting of another power unit being substituted therefor. By using an internal combustion engine, instead of storage batteries, I obtain a uniform or constant speed in contradistinction to the "running down" or variable power of storage batteries, and it is obvious that under normal conditions the power plant is always ready for service and does not require any idle time for charging purposes, as in the case of storage batteries. Since storage batteries must be charged from an electric generator, such generator can be advantageously included in the power unit, and when a truck in accordance with my invention is used in a large industrial plant, its actual service is prolonged and a greater distance is traveled by reason of the source of power at all times being on the truck.

Other than the power unit entering into my invention, I do not care to confine myself to any specific form of truck, and while in the drawings there is illustrated a preferred embodiment of my invention, it is to be understood that the various elements are susceptible to such changes as are permissible by the appended claims.

What I claim is:—

1. The combination with a truck having a framework at one end and an electric motor in said framework for driving said truck, of a power unit for generating current for said motor, said power unit being mounted on said framework and bodily removable and comprising an internal combustion engine, an electric generator at the side of said engine and driven therefrom, a fuel system for said engine, a cooling system for said engine in front of said generator and including a fan driven by said generator, and operating connection from said electric generator to the electric motor of the truck.

2. A power unit as called for in claim 1, and a base supporting said engine, generator and cooling system with an enclosure for the power unit having an apertured control board adjacent the cooling system of the engine.

In testimony whereof I affix my signature in presence of two witnesses.

HAROLD D. GUMPPER.

Witnesses:
ANNA M. DORR,
KARL H. BUTLER.